(12) United States Patent
Nammi et al.

(10) Patent No.: US 9,379,799 B2
(45) Date of Patent: Jun. 28, 2016

(54) SYSTEMS AND METHODS FOR REPORTING PILOT SIGNAL POWER INFORMATION IN A FOUR BRANCH MIMO SYSTEM

(71) Applicant: TELEFONAKTIEBOLAGET L M ERICSSON (PUBL), Stockholm (SE)

(72) Inventors: Sairamesh Nammi, Stockholm (SE); Mark Curran, County Carlow (IE); Namir Lidian, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 154 days.

(21) Appl. No.: 14/112,833

(22) PCT Filed: Aug. 6, 2013

(86) PCT No.: PCT/SE2013/050953
§ 371 (c)(1),
(2) Date: Oct. 18, 2013

(87) PCT Pub. No.: WO2014/025306
PCT Pub. Date: Feb. 13, 2014

(65) Prior Publication Data
US 2014/0064400 A1    Mar. 6, 2014

Related U.S. Application Data

(60) Provisional application No. 61/679,969, filed on Aug. 6, 2012.

(51) Int. Cl.
*H04B 7/02* (2006.01)
*H04B 7/06* (2006.01)
(Continued)

(52) U.S. Cl.
CPC ............ *H04B 7/0623* (2013.01); *H04L 5/0048* (2013.01); *H04W 52/325* (2013.01); *H04B 7/0413* (2013.01); *H04W 52/42* (2013.01)

(58) Field of Classification Search
CPC ... H04B 7/0413; H04B 7/0417; H04B 7/0404
USPC ................................. 375/267, 260; 455/562.1
See application file for complete search history.

(56) References Cited

U.S. PATENT DOCUMENTS

2004/0132494 A1*  7/2004  Tirkkonen et al. ......... 455/562.1
2007/0116095 A1*  5/2007  Gerlach ....................... 375/130

OTHER PUBLICATIONS http://www.gaussianwaves.com/2014/08/characterizing-a-mimo-channel/ by gasussianwaves; signal processing simplified, Aug. 20, 2014. Pdf version pp. 2-3.*

(Continued)

*Primary Examiner* — Daniel Washburn
*Assistant Examiner* — Fitwi Hailegiorgis
(74) *Attorney, Agent, or Firm* — Rothwell, Figg, Ernst & Manbeck, P.C.

(57) ABSTRACT

A base station (102), comprising a first antenna (111) for transmitting a first pilot signal; a second antenna (112) for transmitting a second a pilot signal; a third antenna (113) for transmitting a third pilot signal; and a fourth antenna (114) for transmitting a fourth pilot signal. The base station is configured to transmit pilot signal power information for indicating power values to a user equipment (104), UE, receiving the pilot signal power information. The pilot signal power information comprises: a first power value corresponding to the first pilot signal, a second power value corresponding to the second pilot signal, a third power value corresponding to the third pilot signal, and a fourth power value providing information regarding at least two demodulation pilot signals.

28 Claims, 12 Drawing Sheets

(51) Int. Cl.
  *H04W 52/32* (2009.01)
  *H04L 5/00* (2006.01)
  *H04B 7/04* (2006.01)
  *H04W 52/42* (2009.01)

(56) References Cited

OTHER PUBLICATIONS

Ericsson, "4-branch MIMO for HSDPA" 3GPP TSG RAN WG1 Meeting #65, R1-111763, 2011, 17 pages.
Ericsson et al. "Common Pilot Design for Four branch MIMO System" 3GPP TSG RAN WG1 Meeting #68, R1-120352, 2012, 11 pages.
Ericsson, "New WI: Four Branch MIMO transmissions for HSDPA", feature part, core part, performance part, 3GPP TSG-RAN meeting #53, RP-111393, 2011, 16 pages.
International Search Report and the Written Opinion of the International Searching Authority dated Nov. 5, 2013, in International Application No. PCT/SE2013/050953, 13 pages.
Nokia Siemens Networks, "Pilot design options for 4-branch MIMO" 3GPP TSG RAN WG1 Meeting #69, R1-122569, 2012, 4 pages.
Alcatel-Lucent et al. "Pilot design for 4-branch HSDPA" 3GPP TSG RAN WG1 Meeting #69, R1-122459, 2012, 3 pages.
Ericsson, "Remaining Issues in the Pilot Design Schemes in Four branch MIMO System" 3GPP TSG-RAN WG1 #70, R1-123754, 2012, 8 pages.
Huawei et al. "Further Considerations and Simulations for Pilot Design" 3GPP TSG RAN WG1 Meeting #68, R1-120687, 2012, 11 pages.
MCC Support, "Final Report of 3G TSG RAN WG1 #57bis v1.0.0" 3GPP TSG RAN WG1 Meeting #58, R1-092991, 2009, 70 pages.
Office Action dated Nov. 13, 2014 issued in Bangladesh Patent Application No. 180/2013/4004, 1 page.

* cited by examiner

| PV1 | PV2 | PV3 | PV4 |

FIG. 3a

| PV1 | PV2 | PV3 | PV4 | PV5 | PV6 |

FIG. 3b

| PV1 | PV2 | PV3 | PV4 | PV5 |

FIG. 3c

| Transmit Power value | Offset value1 | Offset value2 | Offset value3 |
|---|---|---|---|
| | | | |

FIG. 4a

| Transmit Power value | Offset value1 | Offset value2 | Offset value3 | Offset value4 | Offset value5 |
|---|---|---|---|---|---|
| | | | | | |

FIG. 4b

| Transmit Power value | Offset value1 | Offset value2 | Offset value3 | Offset value4 |
|---|---|---|---|---|
| | | | | |

FIG. 4c

SYSTEMS AND METHODS FOR REPORTING PILOT SIGNAL POWER INFORMATION IN A FOUR BRANCH MIMO SYSTEM

CROSS REFERENCE TO RELATED APPLICATION(S)

This application is a 35 U.S.C. §371 National Phase Entry Application from PCT/SE2013/050953, filed Aug. 6, 2013, designating the United States, and also claims the benefit of U.S. Provisional Application No. 61/679,969, filed Aug. 6, 2012. The disclosures of both applications are incorporated herein in their entirety by reference.

TECHNICAL FIELD

This disclosure relates to reporting pilot signal information in a 4 branch multiple-input-multiple-output (MIMO) wireless communication system. While terminologies from the $3^{rd}$ Generation Partnership Project (3GPP) may be used in this disclosure for explanation purposes, this should not be seen as limiting the scope of the disclosed subject matter to only the aforementioned system. Other wireless systems, such as Worldwide Interoperability for Microwave Access (WiMax), Ultra Mobile Broadband (UMB), Global System for Mobile Communication (GSM) and others may benefit from exploiting the technological advances described within this disclosure.

BACKGROUND

In a four branch MIMO system, a transmitter (hereafter "base station") I (e.g., radio base station, eNB, eNodeB, NodeB, etc) may use four antennas to transmit data to a receiver (hereafter "user equipment (UE)") (e.g., wireless communication terminal such as a smartphone or other wireless communication device) and the UE may have four antennas for receiving the transmitted data. For each antenna, the transmitter may use the antenna to wirelessly transmit a "common" pilot signal. A "common" pilot signal refers to a known signal that is made available to all UEs and that may be transmitted without user specific beamforming. A pilot signal may have one or both of the following functions: (1) enabling a UE that has knowledge of the power of the pilot signal to use the pilot signal to estimate a transmission channel—for example, determine the quality of the channel that the pilot signal traversed (e.g., the UE may use the pilot signal to determine a signal to noise ratio (SNR) or a signal to interference plus noise ratio (SINR)) and (2) assisting the UE in demodulating downlink data transmitted to the UE by the transmitter.

For each pilot signal transmitted by the transmitter, what is desired is a way to inform the UE of a power value for the pilot signal. The power value may represent the actual power at which the transmitter transmitted the pilot signal.

SUMMARY

In one aspect an improved base station is provided, which improved base station uses multiple antennas (e.g., 4 antennas) to transmit multiple pilot signals (e.g., 6 pilots). The improved base station reports to a UE pilot signal power information.

In one embodiment, a method performed by the base station for providing pilot signal power information includes the base station using: a first antenna to transmit a first pilot signal; a second antenna to transmit a second pilot signal; a third antenna to transmit a third pilot signal; and a fourth antenna to transmit a fourth pilot signal. The base station also transmits pilot signal power information for indicating power values to a UE. The pilot signal power information comprises: a first power value corresponding to the first pilot signal, a second power value corresponding to the second pilot signal, a third power value corresponding to the third pilot signal, and a fourth power value providing information regarding at least two demodulation pilot signals. In some embodiments, the first, second, third and fourth pilot signals are common pilots.

In some embodiments, the method also includes the base station further using the third antenna to transmit a fifth pilot signal (e.g., a first demodulation pilot signal); and the base station further using the fourth antenna to transmit a sixth pilot signal (e.g., a second demodulation pilot signal). The fourth power value corresponds to both the fifth and sixth pilot signals. In some embodiments, the fourth power value indicates that the base station has not used either the third or fourth antenna to transmit a demodulation pilot signal.

In some embodiments, the base station includes: a first antenna for transmitting a first pilot signal; a second antenna for transmitting a second a pilot signal; a third antenna for transmitting a third pilot signal; and a fourth antenna for transmitting a fourth pilot signal. The base station is configured to transmit pilot signal power information for indicating power values to a user equipment, UE. The pilot signal power information comprises: a first power value corresponding to the first pilot signal, a second power value corresponding to the second pilot signal, a third power value corresponding to the third pilot signal, and a fourth power value providing information regarding at least two demodulation pilot signals.

In one aspect, there is provided a method performed by a user equipment (UE). The UE has a first antenna, a second antenna, a third antenna, and a fourth antenna. The method includes: receiving, via the first antenna, a first pilot signal (e.g., a first common pilot signal) transmitted by a first antenna of a base station; receiving, via the second antenna, a second a pilot signal (e.g., a second common pilot signal) transmitted by a second antenna of the base station; receiving, via the third antenna, a third pilot signal (e.g., a third common pilot signal) transmitted by a third antenna of the base station; and receiving, via the fourth antenna, a fourth pilot signal (e.g., a fourth common pilot signal) transmitted by a fourth antenna of the base station. The method also includes processing received pilot signal power information transmitted by the base station. The pilot signal power information comprises: a first power value corresponding to the first pilot signal; a second power value corresponding to the second pilot signal; a third power value corresponding to the third pilot signal; and a fourth power value providing information regarding at least two demodulation pilot signals.

The method may also include the UE: i) using the first power value (PV1) and the first pilot signal to estimate a first channel; ii) using PV1, the second power value, and the second pilot signal to estimate a second channel; and iii) using PV1, the third power value, and the third pilot signal to estimate a third channel.

The method may also include the UE: i) receiving, via the third antenna, a fifth pilot signal (e.g., a first demodulation pilot signal) transmitted by the third antenna of the base station; and ii) receiving, via the fourth antenna, a sixth pilot signal (e.g., a second demodulation pilot signal) transmitted by the fourth antenna of the base station. The fourth power value corresponds to both the fifth and sixth pilot signals. The method of this embodiment further includes the UE: i) using the first power value, the fourth power value, and the fifth pilot signal to demodulate first data (e.g., the first data is data transmitted to the UE from the third antenna of the base station) and ii) using the first power value, the fourth power value, and the sixth pilot signal to demodulate second data (e.g., the second data is data transmitted to the UE from the fourth antenna of the base station).

In another aspect UE is provided. The UE comprises: a first antenna for receiving a first pilot signal transmitted by a first antenna of a base station; a second antenna for receiving a second a pilot signal transmitted by a second antenna of the base station; a third antenna for receiving a third pilot signal transmitted by a third antenna of the base station; and a fourth antenna for receiving a fourth pilot signal transmitted by a fourth antenna of the base station. The UE also includes a data processing system for processing pilot signal power information, transmitted by the base station. The pilot signal power information comprises: a first power value corresponding to the first pilot signal, a second power value corresponding to the second pilot signal, a third power value corresponding to the third pilot signal, and a fourth power value providing information regarding at least two demodulation pilot signals.

In one embodiment, the base station reports to the UE the pilot signal power information by transmitting to the UE a control message (i.e., one or more control messages) that includes: 1) a first power value (PV1) for P-CPICH (primary pilot signal) on the $1^{st}$ antenna; 2) a second power value (PV2) for S-CPICH (secondary pilot signal) on the $2^{nd}$ antenna; 3) a third power value (PV3) for S-CPICH on the $3^{rd}$ antenna; 4) a fourth power value (PV4) for S-CPICH on the $4^{th}$ antenna; and 5) a fifth power value (PV5) for demodulation pilots on the $3^{rd}$ and $4^{th}$ antennas. PV1 may be a value identifying the power at which P-CPICH was or will be transmitted (i.e., transmit power) and the other power values (PV2-PV5) may be power offset values with respect to PV1.

In one embodiment, the base station reports to the UE the pilot signal power information by transmitting to the UE a control message (i.e., one or more control messages) that includes: 1) a first power value (PV1) for P-CPICH (primary pilot signal) on the $1^{st}$ antenna; 2) a second power value (PV2) for S-CPICH (secondary pilot signal) on the $2^{nd}$ antenna; 3) a third power value (PV3) for S-CPICH on the $3^{rd}$ and $4^{th}$ antennas; and 4) a fourth power value (PV4) for demodulation pilots on the $3^{rd}$ and $4^{th}$ antennas. PV1 may be a value identifying the power at which P-CPICH was or will be transmitted (i.e., transmit power) and the other power values (PV2-PV4) may be power offset values with respect to PV1.

In another embodiment, the base station reports to the UE the pilot signal power information by transmitting to the UE a control message that includes: 1) a first power value (PV1) for P-CPICH on the $1^{st}$ antenna; 2) a second power value (PV2) for S-CPICH on the $2^{nd}$ antenna; 3) a third power value (PV3) for S-CPICH on the $3^{rd}$ antenna; 4) a fourth power value (PV4) for S-CPICH on the $4^{th}$ antenna; 5) a fifth power value (PV5) for the demodulation pilot on the 3rd antenna; and 6) a sixth power value (PV6) for the demodulation pilot on the $4^{th}$ antenna. PV1 may be a value identifying the power at which P-CPICH was or will be transmitted and the other power values (PV2-PV6) are power offset values with respect to PV1.

In another aspect an improved UE is provided, which improved UE uses multiple antennas (e.g., 4 antennas) to receive multiple pilot signals (e.g., 6 pilot signals, 2 of which may be demodulation pilots transmitted on the $3^{rd}$ and $4^{th}$ antennas, respectively). The UE may be configured to receive the above described control message transmitted by base station 102. The UE may further be configured to: a) uses a first power value (PV1) contained in the control message and the first pilot signal to estimate a first channel; b) use PV1, a second power value (PV2) contained in the control message, and the second pilot signal to estimate a second channel; c) use PV1, a third power value contained in the control message, and the third pilot signal to estimate a third channel; d) use the first power value, a fourth power value included in the control message, and the fourth pilot signal to estimate a fourth channel; e) use the first power value, a fifth power value included in the control message, and a first demodulation pilot signal to demodulate data; and f) use the first power value, a sixth power value included in the control message, and a second demodulation pilot signal to demodulate data.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

FIG. 3A illustrates information elements included in a control message according to some embodiments.

FIG. 3B illustrates information elements included in a control message according to some embodiments.

FIG. 3C illustrates information elements included in a control message according to some embodiments.

FIG. 4A illustrates a control message according to some embodiments.

FIG. 4B illustrates a control message according to some embodiments.

FIG. 4C illustrates a control message according to some embodiments.

DETAILED DESCRIPTION

Figure 1:
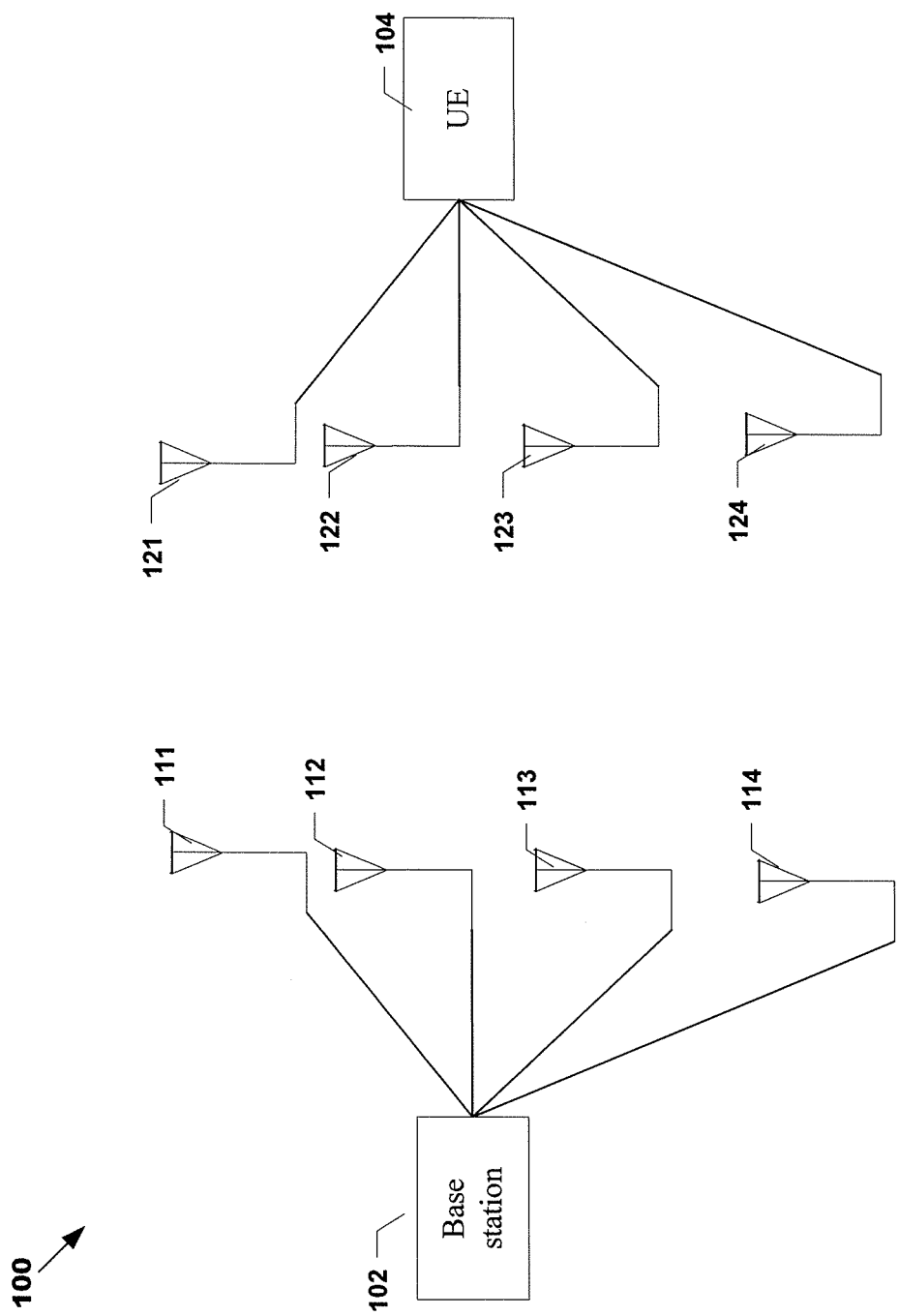
FIG. 1 illustrates an example 4 branch MIMO system.

FIG. 1 illustrates an example 4 branch MIMO system 100. For the sake of illustration, the example system shown includes only a single base station 102 and a single UE 104. Of course, system 100 may include any number of base stations and UEs. As further shown in FIG. 1, base station 102 uses four antennas to transmit data to UE 104 and UE 104 includes four antennas for receiving data transmitted from base station 102. As discussed above, base station 102 may, for each antenna, transmit a pilot signal using the antenna. Thus, UE 104 may receive multiple pilot signals from base station 102. To provide to UE 104 a power value for each transmitted pilot signal, base station 102 may be configured to determine a power value for each pilot signal it will transmit and transmit to UE 104 one or more control messages (e.g., Radio Resource Control (RRC) messages) that together include the determined power values.

Figure 2:
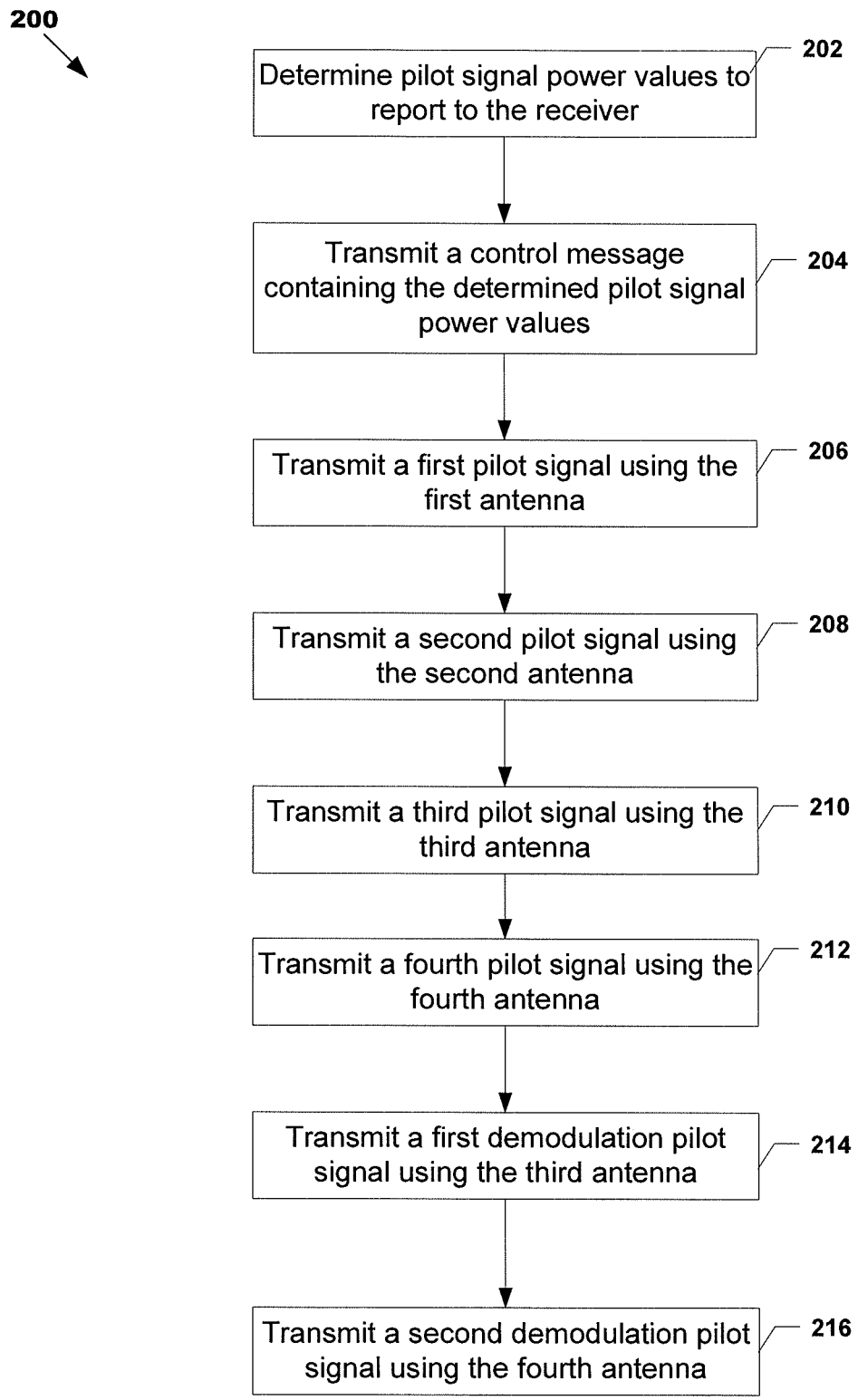
FIG. 2 is a flow chart illustrating a process performed by a transmitter according to some embodiments.

Referring now to FIG. 2, FIG. 2 is a flow chart illustrating a process 200 that may be performed by base station 102.

In step 202, base station 102 determines pilot signal power values to report to UE 104. In step 204, base station 102 transmits a control message (see e.g., FIG. 3A—showing at least a portion of a control message) containing the determined pilot signal power values. In step 206, base station 102 transmits a first pilot signal using the first antenna. In step 208, base station 102 transmits a second pilot signal using the second antenna. In step 210, base station 102 transmits a third pilot signal using the third antenna. In step 212, base station 102 transmits a fourth pilot signal using the fourth antenna.

In additional to transmitting the above mentioned pilots, in some embodiments, base station 102 may transmit one or more additional pilots for data demodulation. Such additional pilots are referred to as "demodulation pilots."

In step 214, base station 102 transmits a first demodulation pilot signal using the third antenna. In step 216, base station 102 transmits a second demodulation pilot signal using the fourth antenna.

FIG. 3A illustrates information elements that may be included in the control message according to one embodiment. For example, as shown in FIG. 3A, the control message may include: (1) a first power value (PV1) (e.g., a power value for a primary common pilot (P-CPICH) on the $1^{st}$ antenna); (2) a second power value (PV2) (e.g., a power value for a secondary common pilot (S-CPICH) on the $2^{nd}$ antenna); (3) a third power value (PV3) (e.g., a power value for S-CPICH on the $3^{rd}$ and $4^{th}$ antennas); and (4) a fourth power value (PV4) for demodulation pilots on the $3^{th}$ and $4^{th}$ antennas. As illustrated in FIG. 4A, PV1 may be a value identifying the power at which P-CPICH was or will be transmitted (i.e., transmit power) and the other power values (PV2-PV4) are power offset values with respect to PV1. Thus, for example, in order to determine the transmit power (actual or nominal) of S-CPICH transmitted on the $2^{nd}$ antenna, the UE 104 computes PV1+PV2 (or PV1−PV2).

FIG. 3B illustrates information elements that may be included in the control message according to another embodiment. For example, as shown in FIG. 3B, the control message may include: (1) a first power value (PV1) for P-CPICH on the $1^{st}$ antenna; (2) a second power value (PV2) for S-CPICH on the $2^{nd}$ antenna; (3) a third power value (PV3) for S-CPICH on the $3^{rd}$ antenna; (4) a fourth power value (PV4) for S-CPICH on the $4^{th}$ antenna; (5) a fifth power value (PV5) for the demodulation pilot on the 3rd antenna; and (6) a sixth power value (PV6) for the demodulation pilot on the $4^{th}$ antenna. As illustrated in FIG. 4B, PV1 may be a value identifying the power at which P-CPICH was or will be transmitted and the other power values (PV2-PV6) are power offset values with respect to PV1.

FIG. 3C illustrates information elements that may be included in the control message according to another embodiment. For example, as shown in FIG. 3C, the control message may include: (1) a first power value (PV1) for P-CPICH on the $1^{st}$ antenna; (2) a second power value (PV2) for S-CPICH on the $2^{nd}$ antenna; (3) a third power value (PV3) for S-CPICH on the $3^{rd}$ antenna; (4) a fourth power value (PV4) for S-CPICH on the $4^{th}$ antenna; (5) a fifth power value (PV5) for the demodulation pilots on the 3rd and $4^{th}$ antennas. As illustrated in FIG. 4C, PV1 may be a value identifying the power at which P-CPICH was or will be transmitted and the other power values (PV2-PV5) are power offset values with respect to PV1.

Figure 5:
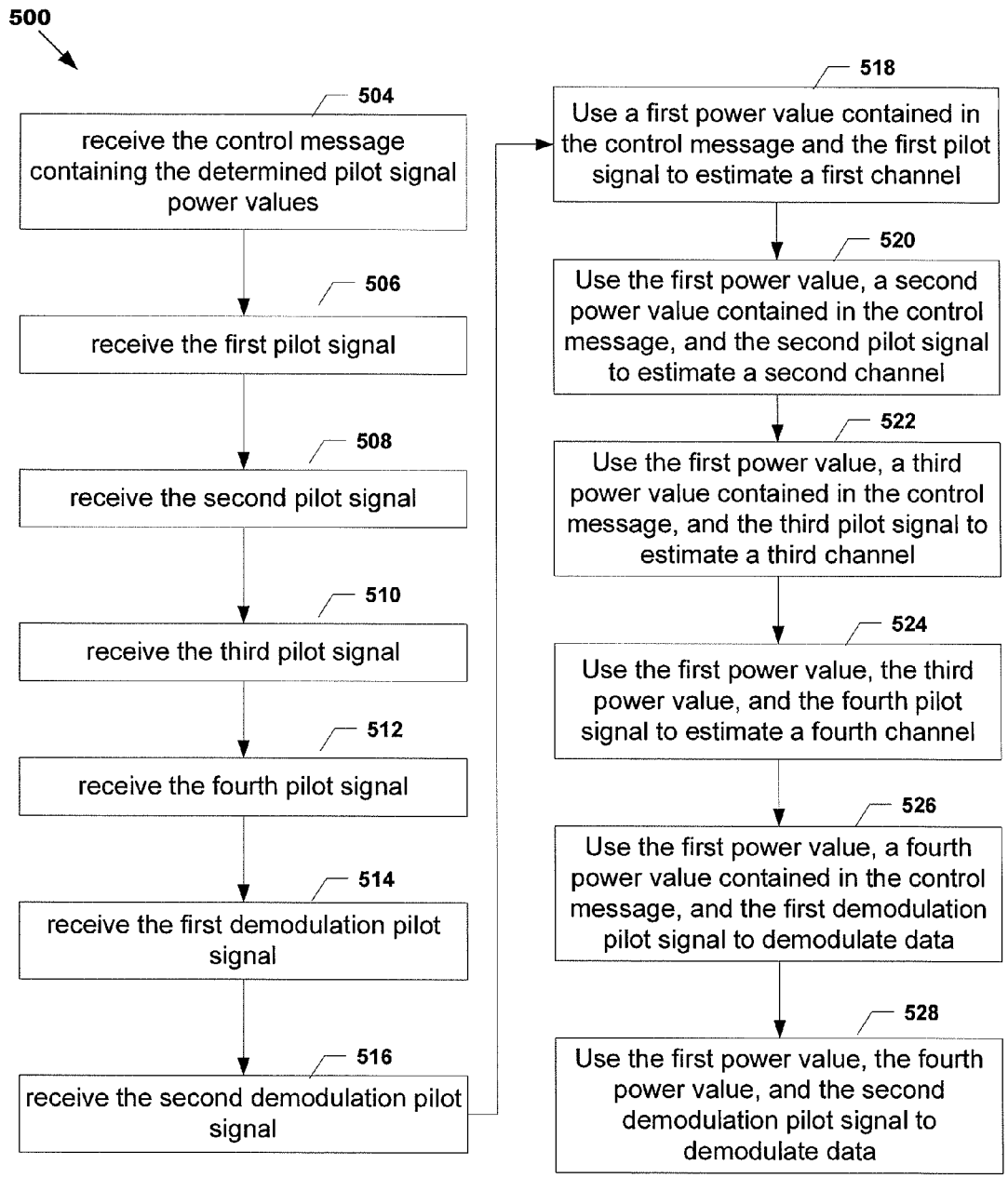
FIG. 5 is a flow chart illustrating a process performed by a receiver according to some embodiments.

Referring now to FIG. 5, FIG. 5 is a flow chart illustrating a process 500 that may be performed by UE 104.

In step 504, UE 104 receives the control message(s) containing the determined pilot signal power values. In step 506, UE 104 receives the first pilot signal. In step 508, UE 104 receives the second pilot signal. In step 510, UE 104 receives the third pilot signal. In step 512, UE 104 receives the fourth pilot signal. In step 514, UE 104 receives the first demodulation pilot signal. In step 516, UE 104 receives the second demodulation pilot signal In step 518, UE 104 uses a first power value (PV1) contained in the control message and the first pilot signal to estimate a first channel. In some embodiments, the first power value identifies the power that at which the first pilot was (or will be) transmitted, but this is not a requirement.

In step 520, UE 104 uses PV1, a second power value (PV2) contained in the control message, and the second pilot signal to estimate a second channel. For example, in some embodiments the second power value is a power offset value with respect to the first power value. Thus, in such embodiments, before estimating the channel, UE 104 first calculates PV1+PV2 (or PV1−PV2).

In step 522, UE 104 uses PV1, a third power value contained in the control message, and the third pilot signal to estimate a third channel. In step 524, UE 104 uses PV1, the third power value, and the fourth pilot signal to estimate a fourth channel. In step 526, UE 104 uses PV1, a fourth power value contained in the control message, and the first demodulation pilot signal to demodulate data. In step 528, UE 104 uses the first power value (PV1), the fourth power value, and the second demodulation pilot signal to demodulate data.

Figure 6:
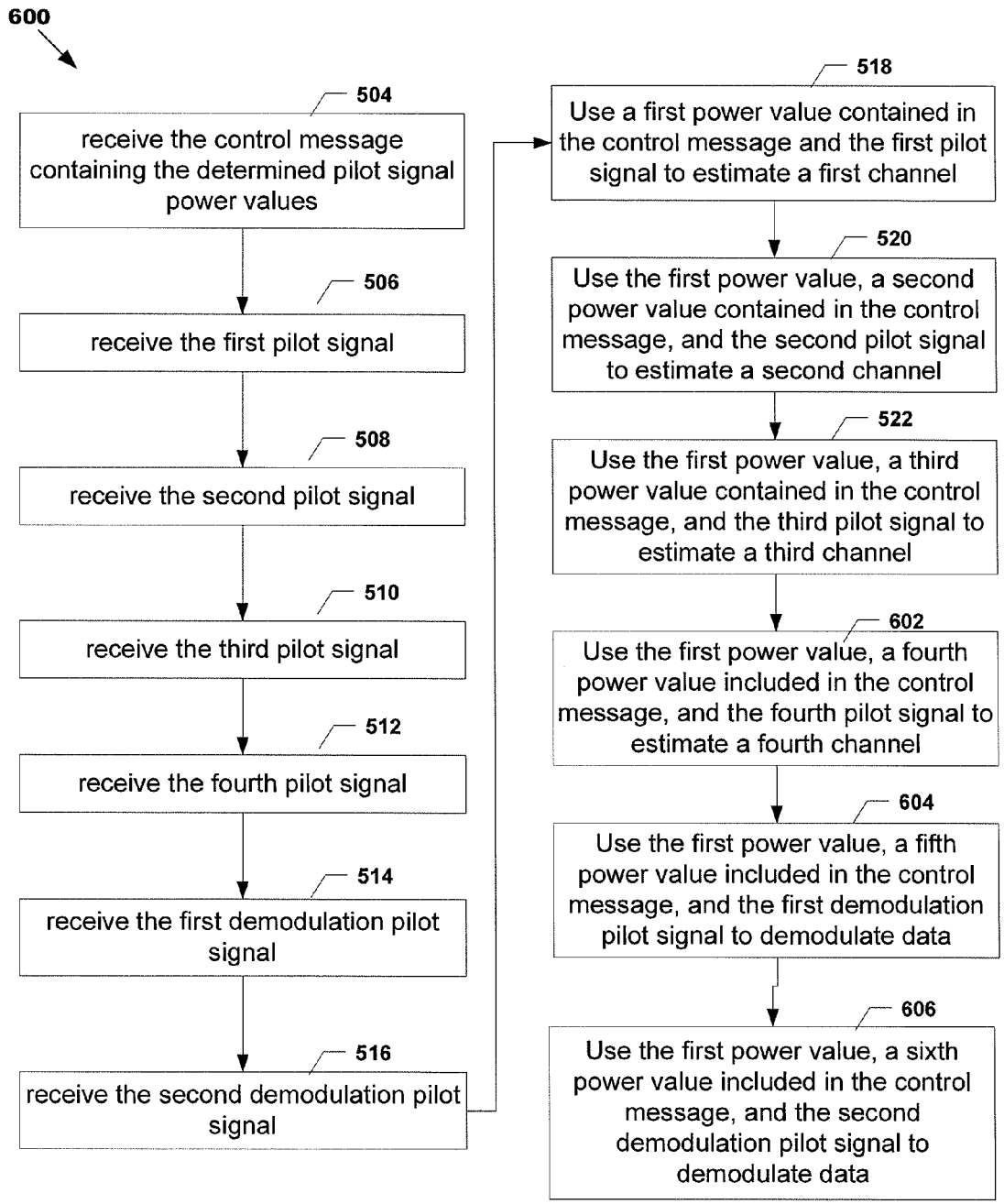
FIG. 6 is a flow chart illustrating a process performed by a receiver according to some embodiments.

Referring now to FIG. 6, FIG. 6 is a flow chart illustrating a process 600 that may be performed by UE 104. Process 600 is similar to process 500. For example, process 600 may begin with steps 502-522. In step 602, UE 104 uses the first power value, a fourth power value included in the control message, and the fourth pilot signal to estimate a fourth channel. In step 604, UE 104 uses the first power value, a fifth power value included in the control message, and the first demodulation pilot signal to demodulate data. In step 606, UE 104 uses the first power value, a sixth power value included in the control message, and the second demodulation pilot signal to demodulate data.

Figure 7:
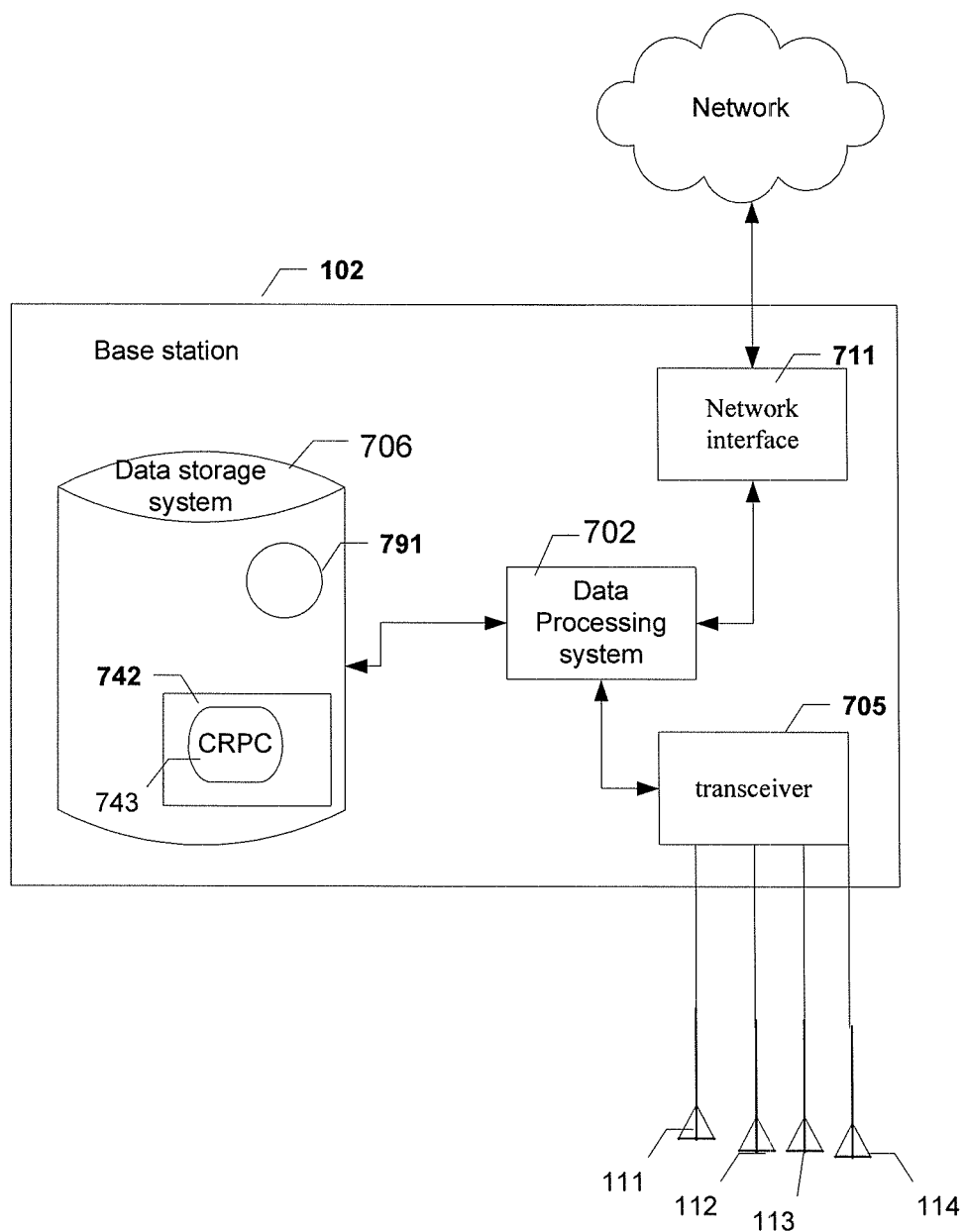
FIG. 7 is a block diagram of a base station according to some embodiments.

Referring now to FIG. 7, FIG. 7 illustrates a block diagram of a base station 102 according to some embodiments. As shown in FIG. 7, the base station 102 may include: a data processing system 702, which may include one or more data processing devices each having one or more microprocessors and/or one or more circuits, such as an application specific integrated circuit (ASIC), Field-programmable gate arrays (FPGAs), etc; a data storage system 706, which may include one or more computer-readable mediums, such as non-volatile storage devices and/or volatile storage devices (e.g., random access memory (RAM)); a transceiver 705 for transmitting data to (and receiving data from) receivers (e.g., receiver 104), and a network interface 711 for connecting base station 102 to a network 110 (e.g, an Internet Protocol (IP) network).

In embodiments where data processing system 702 includes a microprocessor, a computer program product is provided, which computer program product includes: computer readable program code 743 (software), which implements a computer program, stored on a computer readable medium 742, such as, but not limited to, magnetic media (e.g., a hard disk), optical media (e.g., a DVD), memory devices (e.g., random access memory), etc. In some embodiments, computer readable program code 743 is configured such that, when executed by data processing system 702, code 743 causes the base station 102 to perform the steps described herein (e.g., one or more steps shown in the flowcharts and/or described in connection with FIG. 2 and FIG. 11 (discussed below)). In other embodiments, base station 102 may be configured to perform steps described herein without the need for code 743. For example, data processing system 702 may consist merely of specialized hardware, such as one or more application-specific integrated circuits (ASICs). Hence, the features of the present invention described above may be implemented in hardware and/or software. For example, in some embodiments, the functional components of base station 102 described above may be implemented by data processing system 702 executing computer instructions 743, by data processing system 702 operating independent of any computer instructions 743, or by any suitable combination of hardware and/or software.

Figure 8:
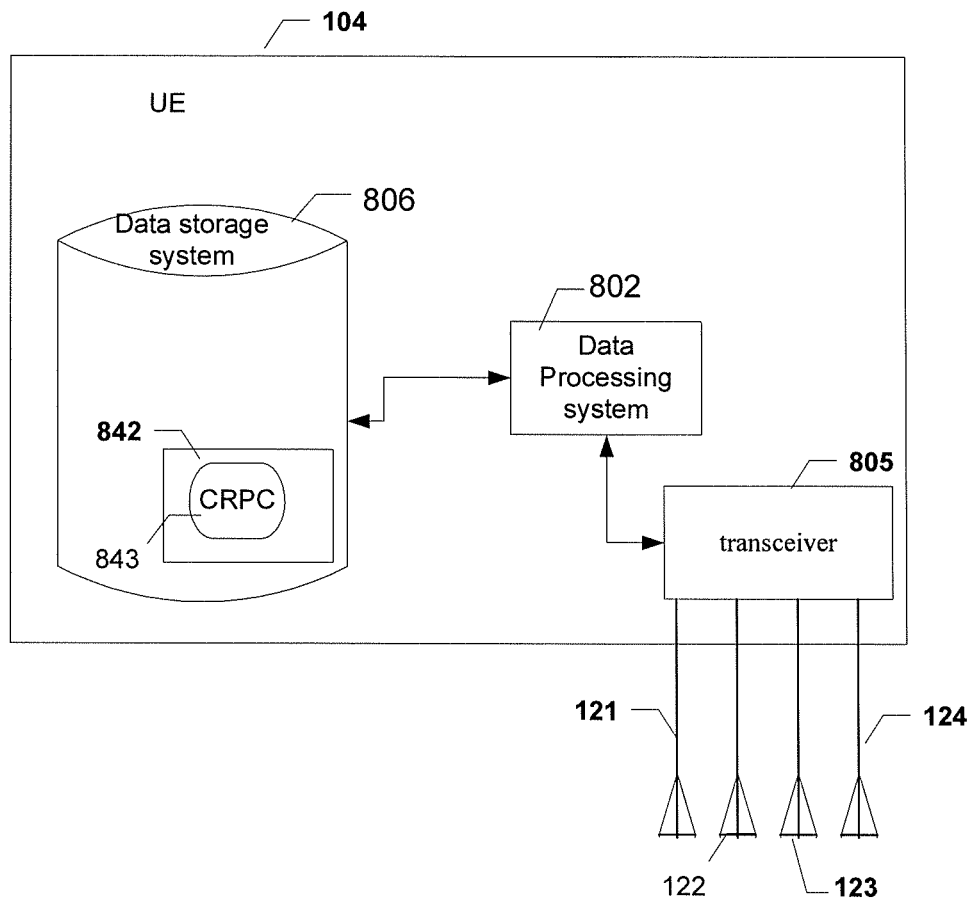
FIG. 8 is a block diagram of a UE according to some embodiments.

Referring now to FIG. 8, FIG. 8 illustrates a block diagram of a UE 104 according to some embodiments. As shown in FIG. 8, the UE 104 may include: a data processing system 802, which may include one or more data processing devices each having one or more microprocessors and/or one or more circuits, such as an application specific integrated circuit (ASIC), Field-programmable gate arrays (FPGAs), etc., for processing pilot signal power information transmitted by base station 102; a data storage system 806, which may include one or more computer-readable mediums, such as non-volatile storage devices and/or volatile storage devices (e.g., random access memory (RAM)); and a transceiver 805 for transmitting data to (and receiving data from) base stations (e.g., base station 104).

In embodiments where data processing system 802 includes a microprocessor, a computer program product is provided, which computer program product includes: computer readable program code 843 (software), which implements a computer program, stored on a computer readable medium 842, such as, but not limited to, magnetic media (e.g., a hard disk), optical media (e.g., a DVD), memory devices (e.g., random access memory), etc. In some embodiments, computer readable program code 843 is configured such that, when executed by data processing system 802, code 843 causes the UE 104 to perform the steps described herein (e.g., one or more steps shown in the flowcharts and/or described in connection with FIGS. 5, 6 and 12 (described below)). In other embodiments, UE 104 may be configured to perform steps described herein without the need for code 843. For example, data processing system 802 may consist merely of specialized hardware, such as one or more application-specific integrated circuits (ASICs). Hence, the features of the present invention described above may be implemented in hardware and/or software. For example, in some embodiments, the functional components of UE 104 described above may be implemented by data processing system 802 executing computer instructions 843, by data processing system 802 operating independent of any computer instructions 843, or by any suitable combination of hardware and/or software.

Figure 9:
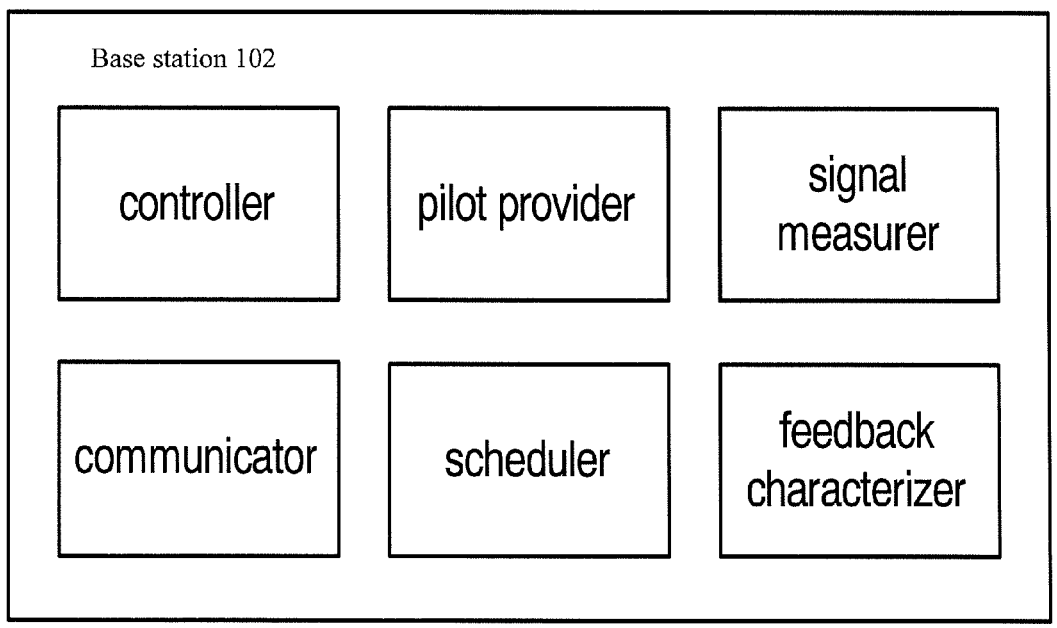
FIG. 9 is a functional block diagram of a base station according to some embodiments.

FIG. 9 illustrates a functional block diagram of an example base station 102. The base station 102 may comprise several devices including a communicator, a pilot provider, a scheduler, a signal measurer, a feedback characterizer and a controller. It is not necessary that each device be implemented as physically separate modules or circuits. Some or all devices may be combined in a physical module.

The communicator may be structured to communicate with other nodes such as UE 102 and to core network nodes. The pilot provider may be structured provide common pilots only or common pilots and additional pilots for data demodulation. The scheduler, in conjunction with the signal measurer and/or the feedback characterizer, may be structured to determine whether additional pilots are beneficial or necessary. The scheduler may also be structured to schedule data transmission to the wireless terminal, the modulation, coding rate, etc. of the data transmission. The signal measurer may be structured to measure uplink signals transmitted from UEs. The feedback characterizer may be structured to characterize the feedback information provided from the UEs. The controller may be structured to control the overall operations of base station 102. For example, the controller may be configured to: determine the pilot power values that base station 102 reports to UEs 104, generate a control message that includes the determined power values, and use the communicator to transmit the control message.

Figure 10:
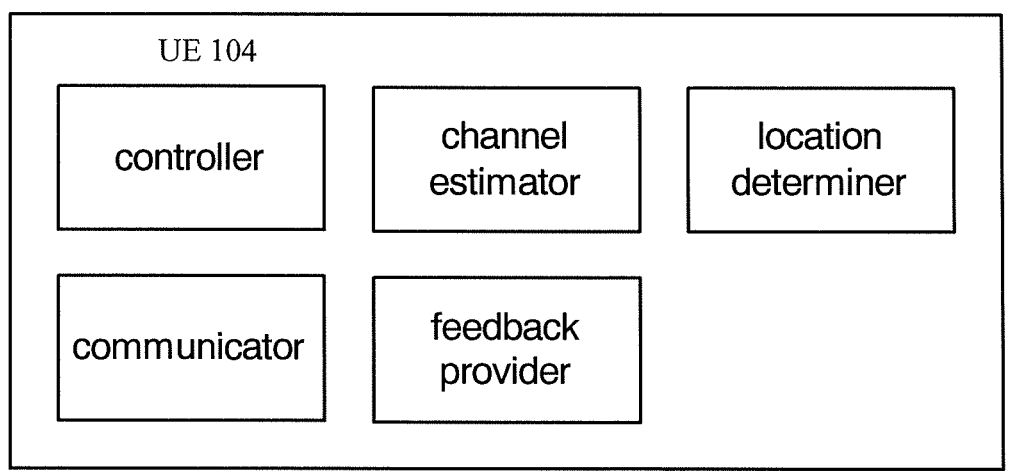
FIG. 10 is a functional block diagram of a base station according to some embodiments.

FIG. 10 illustrates an example of UE 104 capable of a high degree MIMO (e.g., 4×4 MIMO). The UE may comprise several devices including a communicator, a channel estimator, a feedback provider, a location determiner and a controller. It is not necessary that each device be implemented as physically separate modules or circuits. Some or all devices may be combined in a physical module.

The communicator may be structured to wirelessly communicate with other nodes such as base station 102 through signaling. The channel estimator may be structured to estimate channels for CSI estimation and/or data demodulation based on the pilots transmitted from the base station. The location determiner may be structured to determine the location of the UE. The feedback provider may be structured to provide feedback such as channel quality information (CQI) and/or the terminal's location, via the communicator, to the base station. The controller may be structured to control the overall operations of the UE.

Figure 11:
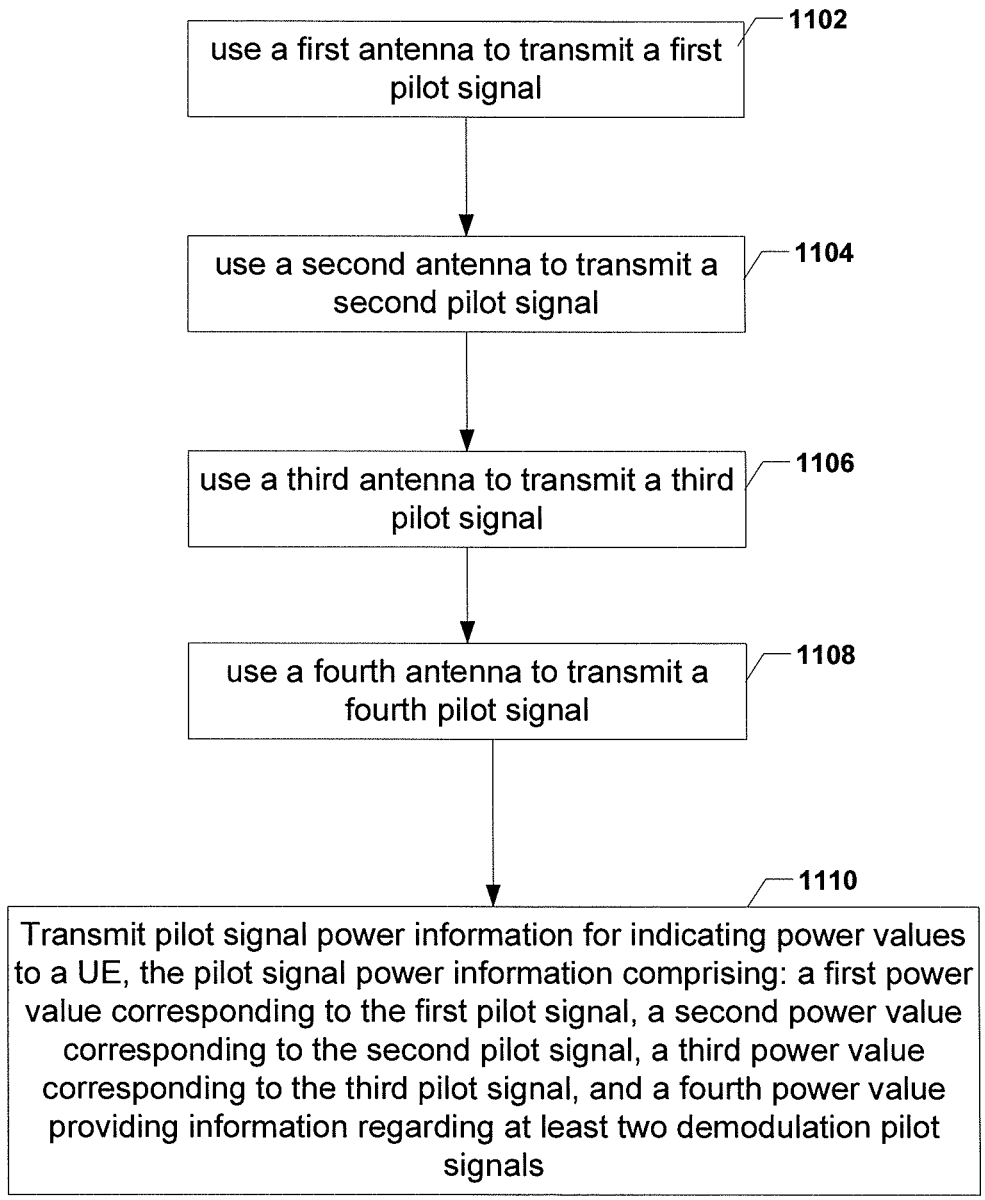
FIG. 11 is a flow chart illustrating a process performed by a base station according to some embodiments.

FIG. 11 is a flow chart illustrating a process 1100, according to some embodiments, performed by base station 102. As shown in FIG. 11, process 1100 includes: the base station using a first antenna 111 to transmit a first pilot signal (step 1102); the base station using a second antenna 112 to transmit a second pilot signal (step 1104); the base station using a third antenna 113 to transmit a third pilot signal (step 1106); the base station using a fourth antenna 114 to transmit a fourth pilot signal (step 1108); and the base station transmitting pilot signal power information for indicating power values to the UE (step 1110). The pilot signal power information includes: a first power value corresponding to the first pilot signal, a second power value corresponding to the second pilot signal, a third power value corresponding to the third pilot signal, and a fourth power value providing information regarding at least two demodulation pilot signals.

Figure 12:
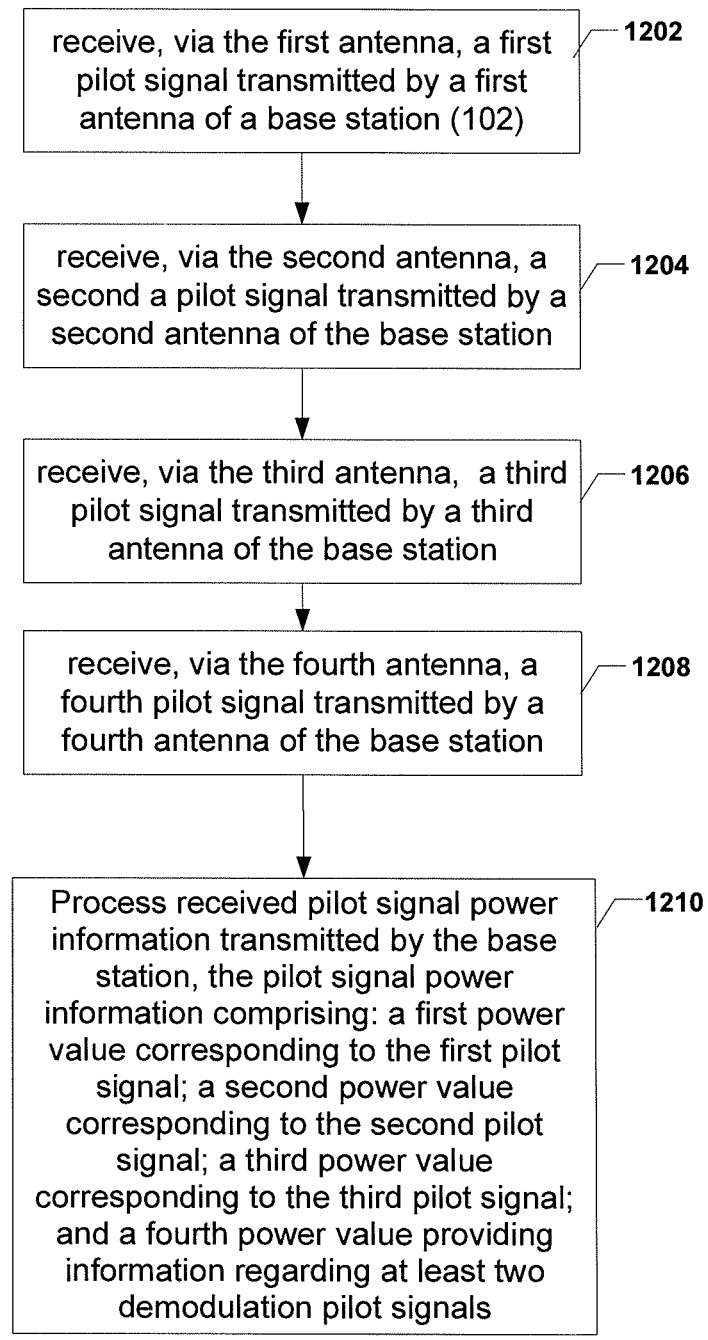
FIG. 12 is a flow chart illustrating a process performed by a UE according to some embodiments.

FIG. 12 is a flow chart illustrating a process 1200, according to some embodiments, performed by UE 104. As shown in FIG. 12, process 1200 includes: the UE receiving, via the first antenna 121, a first pilot signal transmitted by the first antenna 111 of a base station 102 (step 1202); the UE receiving, via the second antenna 122, a second pilot signal transmitted by the second antenna 112 of a base station 102 (step 1204); the UE receiving, via the third antenna 123, a third pilot signal transmitted by the third antenna 113 of a base station 102 (step 1206); and the UE receiving, via the fourth antenna 124, a fourth pilot signal transmitted by the fourth antenna 114 of a base station 102 (step 1208). The process 1200 also includes the UE processing received pilot signal power information transmitted by the base station (step 1210). The pilot signal power information comprises: a first power value corresponding to the first pilot signal, a second power value corresponding to the second pilot signal, a third power value corresponding to the third pilot signal, and a fourth power value providing information regarding at least two demodulation pilot signals.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A base station, comprising:
   a first antenna for transmitting a first pilot signal using a first transmit power;
   a second antenna for transmitting a second a pilot signal using a second transmit power;
   a third antenna for transmitting a third pilot signal using a third transmit power; and
   a fourth antenna for transmitting a fourth pilot signal using a fourth transmit power, wherein
   the base station is configured to transmit a control message comprising:
   first transmit power data for identifying the first transmit power,
   second transmit power data for identifying the second transmit power,
   third transmit power data for identifying the third transmit power, and
   fourth transmit power data providing transmit power information concerning at least two demodulation pilot signals, wherein
   the first transmit power data is separate and distinct from the second, third and fourth transmit power data,
   the second transmit power data is separate and distinct from the third and fourth transmit power data, and
   the third transmit power data is separate and distinct from the fourth transmit power data.

2. The base station of claim 1, wherein the first, second, third and fourth pilot signals are common pilots.

3. The base station of claim 1, wherein
   the base station is further configured to use the third antenna to transmit a fifth pilot signal having a fifth transmit power and use the fourth antenna to transmit a sixth pilot signal having a sixth transmit power,
   the fifth pilot signal is a first demodulation pilot signal,
   the sixth pilot signal is a second demodulation pilot signal, and
   the fourth transmit power data provides information for determining the transmit power of the fifth pilot signal and the transmit power of the sixth pilot signal.

4. The base station of claim 1, wherein the first transmit power is different than the second transmit power.

5. The base station of claim 1, wherein the first transmit power is the same as the second transmit power.

6. The base station of claim 1, wherein
   the first transmit power data consists of a first power value (PV1),
   the second transmit power data consists of a second power value (PV2),
   the third transmit power data consists of a third power value (PV3),
   PV1 identifies the first transmit power,
   PV2 is a first offset value (OV1) for identifying the second transmit power, and
   PV3 is a second offset value (OV2) for identifying the third transmit power.

7. The base station of claim 6, wherein PV1+OV1 identifies the second transmit power.

8. The base station of claim 6, wherein PV1−OV1 identifies the second transmit power.

9. A method performed by a base station for providing pilot signal power information, the method comprising:
   the base station using a first antenna to transmit a first pilot signal;
   the base station using a second antenna to transmit a second pilot signal;
   the base station using a third antenna to transmit a third pilot signal;
   the base station using a fourth antenna to transmit a fourth pilot signal; and
   the base station transmitting a control message comprising:
   first transmit power data for identifying a transmit power of the first pilot signal,
   second transmit power data for identifying a transmit power of the second pilot signal,
   third transmit power data for identifying a transmit power of the third pilot signal, and
   fourth transmit power data providing transmit power information concerning at least two demodulation pilot signals, wherein
   the first transmit power data is separate and distinct from the second, third and fourth transmit power data,
   the second transmit power data is separate and distinct from the third and fourth transmit power data, and
   the third transmit power data is separate and distinct from the fourth transmit power data.

10. The method of claim 9, wherein the first, second, third and fourth pilot signals are common pilots.

11. The method of claim 9, further comprising:
    the base station further using the third antenna to transmit a fifth pilot signal having a fifth transmit power; and
    the base station further using the fourth antenna to transmit a sixth pilot signal having a sixth transmit power, wherein
    the fifth pilot signal is a first demodulation pilot signal,
    the sixth pilot signal is a second demodulation pilot signal, and
    the fourth transmit power data provides information for determining the transmit power of the fifth pilot signal and the transmit power of the sixth pilot signal.

12. The method of claim 9, wherein the fourth transmit power data indicates that the base station has not used either the third or fourth antenna to transmit a demodulation pilot signal.

13. A user equipment, UE, comprising:
    a first antenna for receiving a first pilot signal transmitted by a first antenna of a base station;
    a second antenna for receiving a second a pilot signal transmitted by a second antenna of the base station;
    a third antenna for receiving a third pilot signal transmitted by a third antenna of the base station;
    a fourth antenna for receiving a fourth pilot signal transmitted by a fourth antenna of the base station; and
    a data processing system for processing a control message transmitted by the base station, wherein the control message comprises:
first transmit power data for identifying a transmit power of the first pilot signal,
second transmit power data for identifying a transmit power of the second pilot signal,
third transmit power data for identifying a transmit power of the third pilot signal, and
fourth transmit power data providing transmit power information concerning at least two demodulation pilot signals, wherein
the first transmit power data is separate and distinct from the second, third and fourth transmit power data,
the second transmit power data is separate and distinct from the third and fourth transmit power data, and
the third transmit power data is separate and distinct from the fourth transmit power data.

14. The UE of claim 13, wherein the first, second, third and fourth pilot signals are common pilots.

15. The UE of claim 13, wherein
the first transmit power data consists of a first power value,
the second transmit power data consists of a second power value,
the third transmit power data consists of a third power value, and
the UE is further configured to:
use the first power value (PV1) and the first pilot signal to estimate a first channel,
use PV1, the second power value, and the second pilot signal to estimate a second channel; and
use PV1, the third power value, and the third pilot signal to estimate a third channel.

16. The UE of claim 13, wherein
the UE is operable to use the third antenna to receive a fifth pilot signal transmitted by the third antenna of the base station,
the UE is operable to use the fourth antenna to receive a sixth pilot signal transmitted by the fourth antenna of the base station,
the fifth pilot signal is a first demodulation pilot signal,
the sixth pilot signal is a second demodulation pilot signal, and
the fourth transmit power data corresponds to both the fifth and sixth pilot signals.

17. The UB of claim 16, wherein the UE is further configured to:
use the first transmit power data, the fourth transmit power data, and the fifth pilot signal to demodulate data.

18. The UE of claim 17, wherein the data is data transmitted to the HE from the third antenna of the base station.

19. The UE of claim 16, wherein the UE is further configured to:
use the first transmit power data, the fourth transmit power data, and the sixth pilot signal to demodulate second data.

20. The UE of claim 19, wherein the second data is data transmitted to the UE from the fourth antenna of the base station.

21. A method performed by a user equipment, UE, having a first antenna, a second antenna, a third antenna, and a fourth antenna, the method comprising:
receiving, via the first antenna, a first pilot signal transmitted by a first antenna of a base station;
receiving, via the second antenna, a second a pilot signal transmitted by a second antenna of the base station;
receiving, via the third antenna, a third pilot signal transmitted by a third antenna of the base station;
receiving, via the fourth antenna, a fourth pilot signal transmitted by a fourth antenna of the base station; and
processing received pilot signal power information transmitted by the base station, wherein the pilot signal power information comprises at least four separate and distinct power values, said for separate and distince poer values consisting of:
first transmit power data for identifying a transmit power of the first pilot signal,
second transmit power data for identifying a transmit power of the second pilot signal,
third transmit power data for identifying a transmit power of the third pilot signal, and
fourth transmit power data providing transmit power information concerning at least two demodulation pilot signals; wherein
the first transmit power data is separate and distinct from the second, third and fourth transmit power data,
the second transmit power data is separate and distinct from the third and fourth transmit power data, and
the third transmit power data is separate and distinct from the fourth transmit power data.

22. The method of claim 21, wherein the first, second, third and fourth pilot signals are common pilots.

23. The method of claim 21, wherein
the first transmit power data consists of a first power value,
the second transmit power data consists of a second power value,
the third transmit power data consists of as third power value, and
the method further comprises:
using the first power value (PV1) and the first pilot signal to estimate a first channel;
using PV1, the second power value, and the second pilot signal to estimate a second channel; and
using PV1, the third power value, and the third pilot signal to estimate a third channel.

24. The method of claim 21, further comprising:
receiving, via the third antenna, a fifth pilot signal transmitted by the third antenna of the base station;
receiving, via the fourth antenna, a sixth pilot signal transmitted by the fourth antenna of the base station, wherein
the fifth pilot signal is a first demodulation pilot signal,
the sixth pilot signal is a second demodulation pilot signal, and
the fourth transmit power data corresponds to both the fifth and sixth pilot signals.

25. The method of claim 24, further comprising using the first transmit power data, the fourth transmit power data, and the fifth pilot signal to demodulate first data.

26. The method of claim 25, wherein the first data is data transmitted to the UE from the third antenna of the base station.

27. The method of claim 24, further comprising using the first transmit power data, the fourth transmit power data, and the sixth pilot signal to demodulate second data.

28. The method of claim 27, wherein the second data is data transmitted to the UE from the fourth antenna of the base station.

* * * * *